Figure 5:
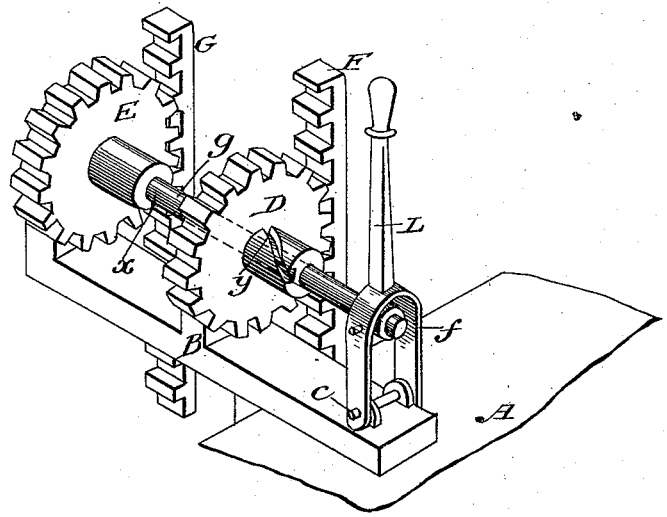

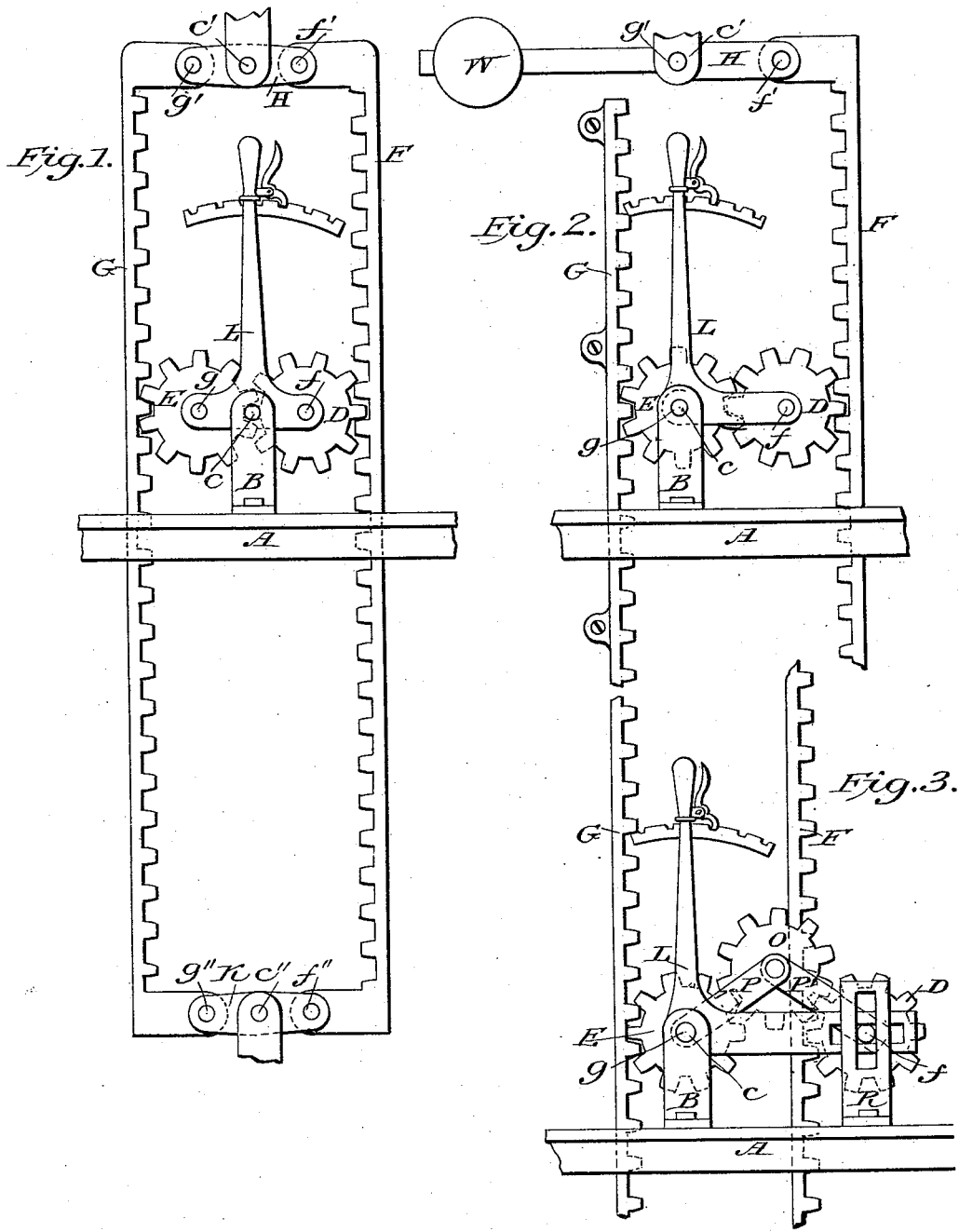

(No Model.) 2 Sheets—Sheet 2.

J. M. LOCKE.
CONTROLLING DEVICE FOR ELEVATORS.

No. 469,196. Patented Feb. 16, 1892.

Witnesses.
Nelson Sayler
Chas. R. Wald

Inventor.
Joseph M. Locke

UNITED STATES PATENT OFFICE.

JOSEPH M. LOCKE, OF CINCINNATI, OHIO.

CONTROLLING DEVICE FOR ELEVATORS.

SPECIFICATION forming part of Letters Patent No. 469,196, dated February 16, 1892.

Application filed April 8, 1891. Serial No. 388,190. (No model.)

*To all whom it may concern:*

Be it known that I, JOSEPH M. LOCKE, a citizen of the United States, residing at Cincinnati, in the county of Hamilton and State of Ohio, have invented a new and useful Shipper Device, of which the following is a specification.

My invention relates to improvements in shipper devices for elevators, which shipper devices are means of so controlling the valve, shipper, or other regulator of the power actuating the platform as to put thereby the movements of said platform under volition of an operator; and the objects of my improvements are, first, to provide better means by which an operator upon an elevator-platform, whether it be in motion or stationary, can readily control the valve, shipper, or other regulator of the actuating power; second, to have the position of the valve, shipper, or other regulator of the motive power at all times known to and under the control of any operator, and, third, the operator to have control of the stopping, starting, direction of motion, and in those cases where the valve, shipper, or other regulator of the motive power governs the speed, to have control also of said speed. These results are attained by two racks extending the entire length of the platform-run, one or both being movable, a movable one having connection to the valve, shipper, or other regulator of the motive power to the platform. Into each rack meshes a wheel, the axes of which are supported from the platform, and between which wheels are appliances uniting their motions. From this construction it is evident that any motion of the platform unaccompanied by a corresponding motion of a rack would transmit rotation to the wheel in mesh with the rack, or conversely any rotation of the wheel without a corresponding motion of the platform would produce a motion of the rack into which the wheel meshes, or if the axis of a wheel is raised or lowered without a corresponding movement of the platform and rotation of the wheel the rack meshing therein would be moved. Hence by changing the relative positions of the platform and one or both axes of the wheels, or by rotating one or both of the wheels, or by combinating all or part of such motions, I transmit motion to one or both of the racks, and thereby to the attached valve, shipper, or other regulator of the motive power of the platform.

In the accompanying drawings, which further illustrate my invention, only a portion of the platform is shown, while the guides, means of elevating and lowering the platform, and all other requisites for an elevator are omitted, as my improvements have no relation to their mode of construction, and they may be of any of the usual forms. Furthermore, for the purpose of brevity, all the figures are drawn and description given for an elevator with a horizontal platform and vertical run, although my invention is applicable to all other forms of elevators.

Figure 4:
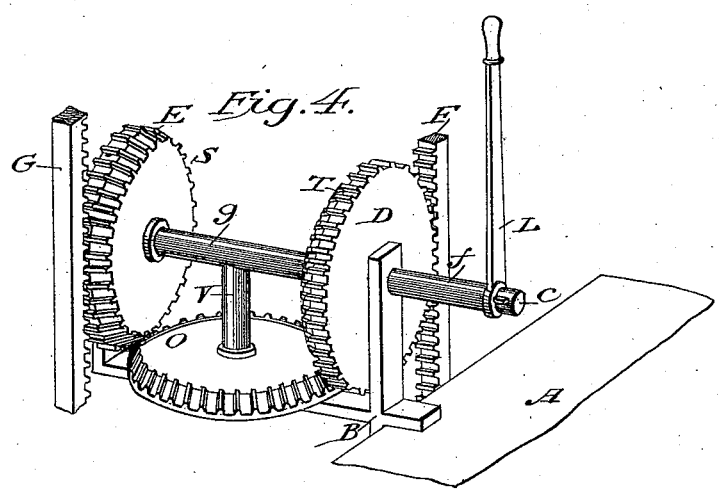

Figure 1 is an elevation of the device; Fig. 2, an elevation of modification; Fig. 3, an elevation of further modification. Fig. 4 is an isometric perspective view of a modification; Fig. 5, an isometric perspective view of a modification.

Similar letters refer to similar part throughout the several views.

Attached to the platform A, Fig. 1, by the fulcrum C is the lever L, and upon which axis C it freely moves. The lever L supports two cog-wheels D and E by means of their respective axes $f$ and $g$. These two wheels are similar and mesh one into the other. D also meshes into the rack F and E into the rack G. These racks F and G extend the full length of the run of the elevator-platform and are attached to the lever H by the axes $f'$ and $g'$, respectively, the fulcrum $C'$ of the lever H being firmly supported. The lower ends of the racks are similarly connected through the lever K by the axes $f''$ and $g''$. The lever K moving upon the fulcrum $c''$, which, like $c'$, is secured by some firm support, the distances $f$ to $c$, $f'$ to $c'$, and $f''$ to $c''$ are equal one to the other, as are also the distances $g$ to $c$, $g'$ to $c'$, and $g''$ to $c''$, and the racks F and G are parallel to the run of the elevator-platform A. Consequently when said platform is moved up or down the wheels D and E remain in mesh with the racks F and G, respectively, and as the wheels D and E are of equal diameter and pitch and are revolved in opposite directions by motion of the platform A there is no interference from the wheels, being in mesh one with the other.

They at the same time hold the racks firmly from any vertical movement by oscillation of the levers H and K; but if the upright portion of the lever L be moved to the right the rack F will be lowered and the rack G elevated. If the lever L be moved in the opposite direction, there will be a corresponding reverse movement of the racks F and G. During all such changes the racks will remain parallel, and as the lever L is moved either to the right or left the racks F and G, in addition to the movements up and down, will be brought closer together or farther apart, so as always to be in proper pitch with the wheels D and E, owing to the fact that the distances $c''$ to $f''$ and $c'$ to $f'$ are each equal to $c$ to $f$, and the distances $c''$ to $g''$ and $c'$ to $g'$ are each equal to $c$ to $g$. It is further evident that the amount and direction of the motion vertically of the racks F and G are entirely under the control of an operator, and as the valve, shipper, or other regulator of the platform motive power can be attached to a rack or any of its moving attachments the operator will have full knowledge of the position and control of movements of said valve, shipper, or other regulator; and, furthermore, it is evident that a state of rest or motion of the platform A has no influence upon the aforementioned movements of the racks F and G. The relative amount of motion communicated to the racks F and G by moving the lever L is governed by the direct ratio of the distances $c\,f$ to $c\,g$. Hence when the axis $c$ is centrally located between $f$ and $g$ the movements of the racks F and G, although in opposite directions, will be equal in amount, and when $c$ is nearer $f$ or $g$ the amount of motion communicated to each rack is unequal, and, as before stated, is equal to the ratio of the parts into which the distance $f\,g$ is divided by the position of $c$. When $c$ is concentric with $f$ or $g$, one of the parts $f$ to $g$ will equal zero. Consequently one rack will have no motion and the other all thereof. This last condition is illustrated by Fig. 2, in which $c$ is concentric with $g$, and consequently $c'$ with $g'$ and $c''$ with $g''$, and the rack G will receive no motion from the lever L, the rack F receiving all thereof. In this case the rack G can be secured to the fixed structure about the elevator and the rack F counterpoised, as by a weight W, upon a prolongation of H. When it is desirable to have the wheels D and E revolve in the same direction, an idler can be placed between said wheels and the racks upon similar sides of the wheels. This modification is illustrated by Fig. 3, and by the introduction of radial arms P P' to retain the idler O always in mesh with the wheels D and E and the bearing of $f$ in the lever L slotted and the vertical slotted guide R attached to the platform A for the bearing $f$ I would have an arrangement in which the movements of the rack F could be confined to a vertical direction alone, and when the axis $g$ is not concentric with $c$ it also could be similarly restricted, so that both racks would have vertical movements only. If the axes $f$ and $g$ are both to be made concentric with $c$, then the distances $f\,c$ and $g\,c$ would both be reduced to zero, and as neither of the axes $f$ or $g$ would receive any vertical motion from movement of the lever L no vertical movement would be given to either rack in that way; but a vertical motion can be given to the racks F and G through the wheels D and E from motion given to the lever L by rotating said wheels D and E, which, in case the platform A is in motion, must be in addition to or retardation of the rotation resulting from said moving platform. This modification is shown in Fig. 4, wherein the wheels D and E, which can revolve freely upon the common axis $c\,f\,g$, each have firmly and concentrically attached a bevel gearwheel S and T, both meshing into idler O, revolving upon a stud V, projecting from the axis $c\,f\,g$. The racks F and G are in mesh upon opposite sides of the wheels D and E, which wheels are consequently revolved in opposite directions by any movement of the platform A, and which revolutions are not interfered with by said idler O, which revolves freely upon the stud V; but by moving the lever L, which is secured firmly to the axis $c\,f\,g$, to the right a corresponding rotary motion will be transmitted to the axis $c\,f\,g$, thence through the stud V to the idler O and bevel-gears S and T to the wheels D and E, resulting in elevating the rack G and depressing the rack F. Reverse motion of the lever L would produce reverse movements of the racks F and G.

In the foregoing it is assumed that the racks are geared to move vertically in opposite directions and in proper ratio one to the other.

Fig. 5 illustrates when the axis $f$ and $g$ are concentric, and, assuming them to be continuous, the wheels D and E are secured thereto by feathers $x$ and $y$, one or both of which may be spiral; but if both are spiral they must differ either in direction or in amount of their pitch. The lever L, with its fulcrum at $c$, is so connected to the axis $f$ and $g$ that while not interfering with their revolution can nevertheless move $f\,g$ longitudinally. The wheels D and E are not to move horizontally, but remain in mesh with the racks F and G, respectively, while the axis $f\,g$, with the feather-slide through them, assuming only that the feather $y$ to be spiral, any longitudinal movement of the axis $f\,g$ by the lever L would rotate the wheel D and move the rack F vertically, in which case the rack G could be secured in a fixed position. If the feather $x$ is also spiral, then the racks would require to be so geared as to have proper relative movements.

In the descriptions of the actions of the modifications, as shown in Figs. 2, 3, 4, and 5, I have not repeated the facts that the amount and direction of the motion vertically of the racks F and G are entirely under the control of an operator, and as the valve, shipper, or other regulator of the platform motive power can be attached to a rack or any of its moving attachments the operator will have full knowledge of the position and control of movements of said valve, shipper, or other regulator; and, furthermore, that a state of rest or motion of the platform A has no influence upon the aforementioned movements of the racks F and G, and in those cases where by tension the movements of the racks can be transmitted to said valve, shipper, or other regulator the racks can be flexible, such as perforated strips, chains, &c.

I do not confine my claims to the use of the special mechanism for transmitting motion from an operator to the axes $f$ and $g$ or wheels D and E, as herein set forth, but have selected from the many available ones, some to readily demonstrate such transmissions.

I am aware that prior to my invention that there existed various methods for transmitting motion from an elevator-platform for controlling the motive power not thereon; but What I do claim as my invention, and desire to secure by Letters Patent, is—

1. In controlling devices for elevators, the combination of a movable rack-bar suspended in the elevator-runway, an elevator-car provided with adjustable gears, another rack-bar in mesh with one of said gears and adapted to rotate them upon the movement of the elevator-car, and means on the car for adjusting the position of the gears to operate the movable rack-bar, all substantially as described.

2. In controlling devices for elevators, the combination of two movable rack-bars extending along the course of the elevator-travel, an elevator-car provided with adjustable gears properly in mesh with said rack-bars, which are adapted to rotate said gears upon the movement of the elevator-car, and means on the car for adjusting the position of the gears to operate the movable rack-bars, as desired, substantially as shown, and for the purposes specified.

JOSEPH M. LOCKE.

Witnesses:
THOS. A. LOGAN,
ALFRED MEINICKE.